United States Patent
Rousstia et al.

(10) Patent No.: US 10,535,915 B2
(45) Date of Patent: Jan. 14, 2020

(54) ANTENNA MODULE AND TRANSCEIVER

(71) Applicant: TE Connectivity Nederland BV, s'Hertogenbosch (NL)

(72) Inventors: Mohadig Widha Rousstia, Eindhoven (NL); Saoer Maniur Sinaga, Utrecht (NL); Martinus E. J. J. Panis, Den Dungen (NL); Rainer Oliver Hornung, s-Hertogenbosch (NL)

(73) Assignee: TE Connectivity Nederland BV, s'Hertogenbosch (NL)

( * ) Notice: Subject to any disclaimer, the term of this patent is extended or adjusted under 35 U.S.C. 154(b) by 158 days.

(21) Appl. No.: 15/784,728

(22) Filed: Oct. 16, 2017

(65) Prior Publication Data

US 2018/0108975 A1 Apr. 19, 2018

(30) Foreign Application Priority Data

Oct. 14, 2016 (EP) ..................... 16194006

(51) Int. Cl.
| | |
|---|---|
| *H01Q 1/24* | (2006.01) |
| *H01Q 1/38* | (2006.01) |
| *H01Q 15/24* | (2006.01) |
| *H04B 1/40* | (2015.01) |
| *H04L 5/14* | (2006.01) |

(52) U.S. Cl.
CPC .............. *H01Q 1/243* (2013.01); *H01Q 1/38* (2013.01); *H01Q 15/24* (2013.01); *H04B 1/40* (2013.01); *H04L 5/14* (2013.01)

(58) Field of Classification Search
CPC ........... H01Q 1/243; H01Q 1/00; H01Q 1/38; H01Q 15/24; H04B 1/40; H04L 5/14
See application file for complete search history.

(56) References Cited

U.S. PATENT DOCUMENTS

| | | | |
|---|---|---|---|
| 2009/0296609 A1* | 12/2009 | Choi ................... | H04W 72/121 370/281 |
| 2010/0156726 A1* | 6/2010 | Montgomery ........... | H01Q 7/00 343/700 MS |
| 2017/0054196 A1* | 2/2017 | Hu ......................... | H01Q 1/243 |
| 2017/0176572 A1* | 6/2017 | Charvat ................ | H01Q 1/525 |

OTHER PUBLICATIONS

European search report, dated Mar. 30, 2017, 9 pages.

\* cited by examiner

*Primary Examiner* — Dameon E Levi
*Assistant Examiner* — David E Lotter

(57) ABSTRACT

An antenna module and a transceiver that includes the antenna module which allow high-speed full-duplex communication. The antenna module has at least one antenna for transmitting and receiving electromagnetic radiation, at least one transmitter connection element and at least one receiver connection element for electrically connecting the antenna module to a transmitter circuit and a receiver circuit. The at least one transmitter connection element is in a transmitter section, the at least one receiver connection element is in a receiver section, and the at least one antenna is in an antenna section. The antenna section is between the at least one receiver section and the at least one transmitter section.

18 Claims, 4 Drawing Sheets

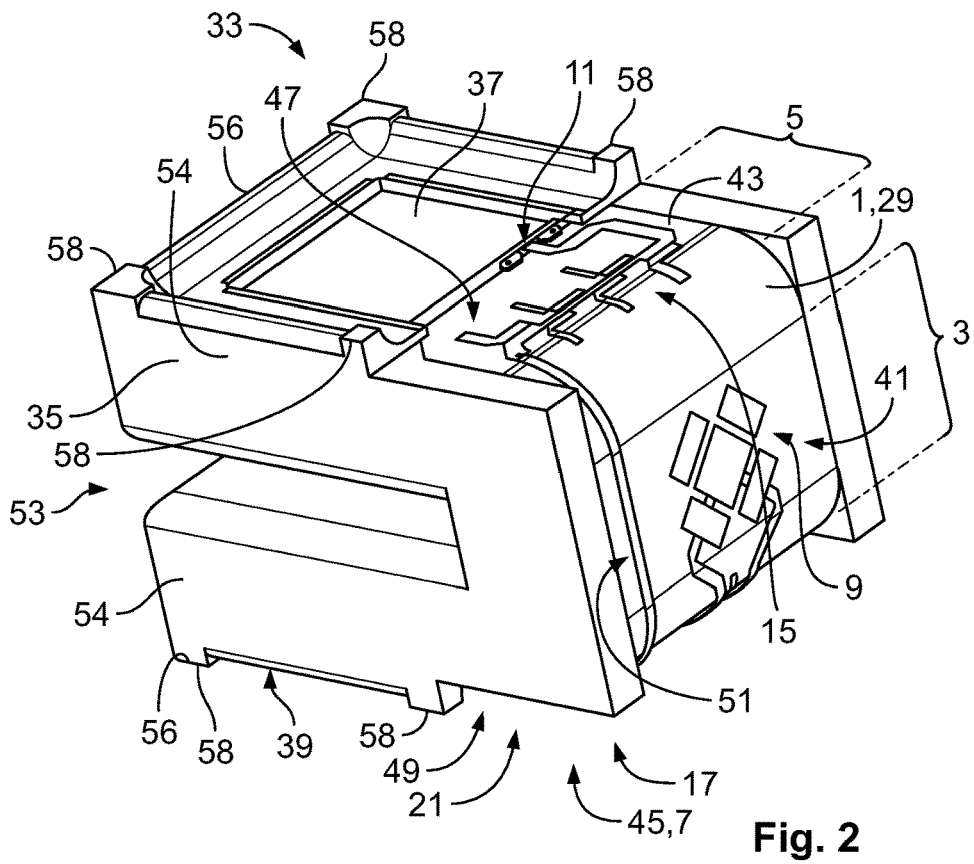

ANTENNA MODULE AND TRANSCEIVER

CROSS-REFERENCE TO RELATED APPLICATIONS

This application claims the benefit of the filing date under 35 U.S.C. § 119(a)-(d) of European Patent Application No. 16194006.9 filed on Oct. 14, 2016.

FIELD OF THE INVENTION

The present invention relates, in general, to communications systems and, in particular, to an antenna module and transceiver for a millimeter-wave communications system.

BACKGROUND

In high-bandwidth and low-latency communication systems, for example in multi-gigabit communication systems, a full-duplex transmission in which transmitter and receiver are used simultaneously is usually preferred over a half-duplex transmission in which either the transmitter or the receiver is used. However, a half-duplex transmission, (i.e., a time-division duplex technique) often has to be used in order to clearly separate incoming and outgoing signals.

SUMMARY

An antenna module, constructed in accordance with the present invention, includes a transmitter section, at least one transmitter connection element in the transmitter section, and a transmitter circuit. This antenna module also includes a receiver section, at least one receiver connection element in the receiver section, and a receiver circuit. There is at least one transmitter connection element in the transmitter section and at least one receiver connection element in the receiver section. An antenna module, constructed in accordance with the present invention, further includes at least one antenna section electrically connected between the at least one receiver section and the at least one transmitter section. An antenna module, constructed in accordance with the present invention, also includes at least one antenna in the antenna section which receives electromagnetic radiation and transmits electromagnetic radiation.

An antenna module, constructed in accordance with the present invention, is capable of a full-duplex transmission, especially for millimeter-wave communication at high bandwidth with low latency.

A transceiver, constructed in accordance with the present invention, includes at least one mounting structure and an antenna module, constructed in accordance with the present invention as set out above.

A transceiver, constructed in accordance with the present invention, is capable of a full-duplex transmission, especially for millimeter-wave communication at high bandwidth with low latency.

In the following figures, elements having the same function and/or the same structure will be referenced by the same reference signs.

BRIEF DESCRIPTION OF THE DRAWINGS

In the drawings:

FIG. 2 is a perspective view of a transceiver constructed in accordance with the present invention with the transceiver having the FIG. 1 antenna module;

FIG. 3 is a perspective view of an exemplary application of two transceivers in a communication system according to the present invention;

DETAILED DESCRIPTION OF THE EMBODIMENT(S)

Figure 1:
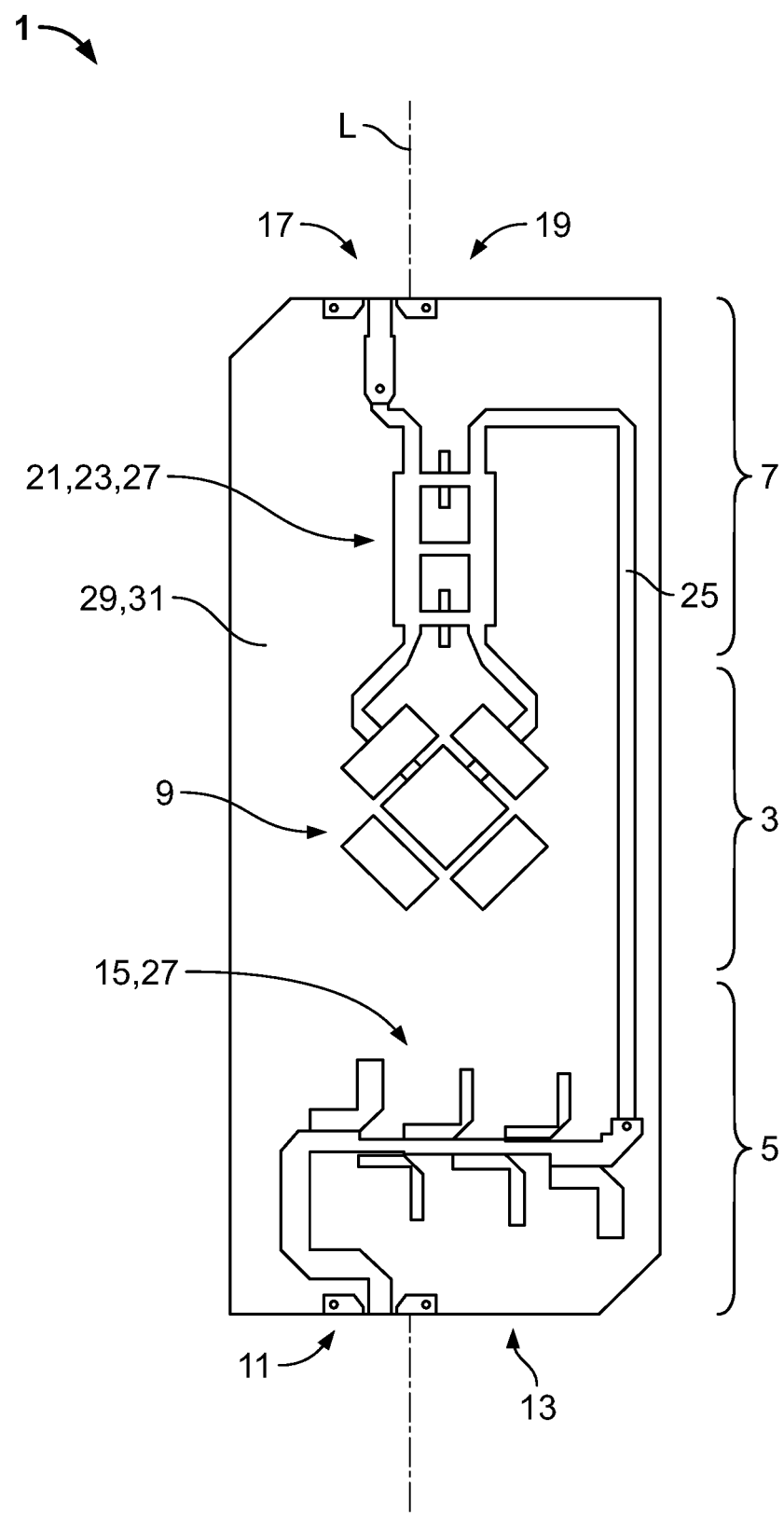
FIG. 1 is a top view of a preferred embodiment of an antenna module constructed in accordance with the present invention.

In the following, a preferred embodiment of an antenna module 1 is described with respect to FIG. 1. The antenna module 1 has an overall strip-like shape and basically extends in parallel to a longitudinal direction L of the strip-like shape.

The antenna module 1 can be separated into three sections: an antenna section 3, a receiver section 5 and a transmitter section 7. The antenna section 3 is arranged between the receiver section 5, and the transmitter section 7. In other words, along the longitudinal direction L, the antenna section 3 follows the receiver section 5 and the transmitter section 7 follows the antenna section 3.

The arrangement of the sections according to the invention may result in distances between the objects on the carrier structure wherein a distance between the at least one transmitter connection element and the at least one receiver connection element is always larger than a distance between the at least one transmitter connection element and the at least one antenna and/or between the at least one receiver connection element and the at least one antenna.

The antenna section 3 has an antenna 9, which is preferably arranged in the center of the antenna module 1. The antenna 9 is intended to emit and receive electromagnetic radiation.

The receiver section 5 has the receiver connection element 11 for connecting the antenna module 1 to a receiver (not shown). Preferably, the receiver connection element 11 is at an end 13 of the antenna module 1 in the longitudinal direction L.

The receiver section 5 is also has a filter circuit 15, which is electrically connected to the receiver connection element 11.

The transmitter section 7 has a transmitter connection element 17 for connecting the antenna module 1 to a transmitter (not shown). Preferably, the transmitter connection element 17 is at an end 19 of the module 1 in the longitudinal direction L which lies opposite to the end 13 where the receiver connection element 11 is located.

The transmitter section 7 also has a polarizer circuit 21 which is preferably formed as a circular polarizer 23 for providing circular polarized electromagnetic radiation which can be radiated from the antenna 9. The polarizer circuit 21 is preferably directly electrically connected to the antenna 9 and to the transmitter connection element 17. Further, the polarizer circuit 21 is electrically connected to the filter circuit 15. In other words, the filter circuit 15 is connected to the antenna 9 via the polarizer circuit 21.

A conductor 25, extending across the antenna section 3 from the polarizer circuit 21 to the filter circuit 15, electrically connects the polarizer circuit 21 with the filter circuit 15. The conductor 25 extends parallel to the longitudinal direction L and is spaced apart from the antenna 9 in a direction perpendicular to the longitudinal direction L.

Preferably, the filter circuit 15 and the polarizer circuit 21 are passive electrical components 27.

The antenna module 1 comprises a carrier structure 29 which is preferably a substrate for a printed circuit board. The carrier structure 29 basically defines the overall shape of the antenna module 1 and, therefore, has an overall strip-like shape extending basically parallel to the longitudinal direction L.

Preferably, the components, as described above, such as the antenna 9, the polarizer circuit 21, the filter circuit 15, and the connector elements 11 and 17 are on the carrier structure 29 and form a circuit board.

The carrier structure 29 is preferably flexible. In particular, the carrier structure 29 is preferably made from a flexible printed circuit board substrate 31. Consequently, at least the connectors connecting the components of the antenna module are preferably flexible conductors. It is also possible that at least one of the antenna 9, the polarizer circuit 21, and the filter circuit 15 are at least partially made from flexible material, such as flexible conductors. A preferred material for the carrier structure 29 is liquid crystal polymer (LCP).

FIG. 2 shows an embodiment of a transceiver 33 according to the present invention. The transceiver 33 comprises a mounting structure 35 which preferably carries a transmitter circuit 39 and a receiver circuit 37. Preferably, the transmitter circuit 39 and the receiver circuit 37 are on opposite sides of the mounting structure 35 in order to prevent cross-talking between the circuits.

Alternatively, the transceiver does not have a transceiver circuit and a receiver circuit directly mounted on the mounting structure 35, but elsewhere. In this case, the mounting structure 35 carries connection elements which are adapted to establish a connection to the circuits.

The transceiver 33 is has an antenna module 1 according to the present invention. In the preferred embodiment as shown in FIG. 2, the transmitter connection element 17 of the antenna module 1 is electrically connected to the transmitter circuit 39 and the receiver connection element 11 is electrically connected to the receiver circuit 37.

The antenna module 1 has an overall U-shape, wherein the antenna 9 is located on a base 41 of the U-shape. The base 41 of the U-shape is basically formed by the antenna section 3 of the antenna module 1. Legs 43 and 45 of the U-shape extend from the base 41 and are basically parallel to and spaced apart from each other.

The leg 43 is basically formed by the receiver section 5 and carries the receiver connection element 11 and the filter circuit 15. The leg 45 is basically formed by the transmitter section 7 and carries the transmitter connection element 17 and the polarizer circuit 21. Thus, the connection elements 11 and 17 are located on free ends 47 and 49 of the legs 43 and 45, respectively.

Filter circuit 15, electrically connected to the at least one transmitter connection element and/or to the at least one receiver connection element, further increases the integration of components on the antenna module and allows keeping the lengths of conductive paths short. Such a filter circuit may, for example, comprise a band pass filter, a low pass filter, a high pass filter and/or any other required filter or any combination of these. Preferably, the at least one filter circuit is directly electrically connected to the at least one polarizer circuit.

The U-shape of the antenna module 1 may be achieved by bending a flexible antenna module 1 around the mounting structure 35. However, the antenna module 1 may also be bent in a production step prior to attaching the antenna module 1 on the mounting structure 35.

Alternatively, the antenna module 1 may have a carrier structure 29 made from a solid material. In order to achieve a U-shape, or another required shape, the carrier structure 29 may then be produced in the shape, for example by injection molding.

The mounting structure 35 is partially enveloped by the U-shaped antenna module 1. Consequently, the antenna module 1 is arranged on an outer side 51 of the mounting structure 35. This arrangement allows an undisturbed radiation from the antenna 9.

On a side facing away from the antenna 9, the transceiver 33 has a connection area 53. The connection area 53 extends slit-like into the mounting structure 35, wherein a plane of the slit extends between the transmitter circuit 39 and the receiver circuit 37 and basically parallel with the legs 43 and 45 of the antenna module 1. The connection area 53 can be used for receiving a printed circuit board. The transceiver 33 may comprise electrical contacts in the connection area 53 (not shown) which are adapted for electrically contacting complementary contacts on a printed circuit board when such board is received in the connection area 53.

Preferably, the receiver circuit 37 and the transmitter circuit 39 are electrically connected to a printed circuit board by electric traces which can be arranged on side walls 54 of the mounting structure 35. Side walls 54 and rear walls 56 of the mounting structure 35 may project from the remaining mounting structure 35 such that the receiver circuit 37 and the transmitter circuit 39 are each at least partially surrounded by the walls 54 and 56. The walls 54 and 56 preferably extend or project in directions perpendicular to the slit-like connection area 53. The walls 54 and 56 may prevent resin (not shown) which may be applied on electrical contacts of the circuits 37 and 39 from flowing off the area in which circuits 37 and 39 are arranged.

The walls 54 and 56 preferably have support members 58 which may project further from the remaining mounting structure 35 than the walls 54 and 56. The support members 58 are preferably arranged at intersections of the walls 54 and 56 and at the ends of the side walls 54 which are located closer to the antenna module 1. The support members 58 may be used for supporting and positioning heatsink structures on the circuits 37 and 39.

FIG. 3 shows an example of a communication system 55. The communication system 55 comprises two transceivers 33 according to the invention, each with a mounted antenna module 1. Each of the transceivers 33 is electrically connected to a printed circuit board 57 which is received in the connection area 53.

The transceivers 33 as shown in FIG. 3 are basically identical to the one as described with respect to FIG. 2, with one exception. The transceivers 33 of the second embodiment have two fastening members 59 each. The fastening members 59 are shaped as pins and extend from side faces 61 of the mounting structure 35. Side faces 61 are arranged perpendicular to the legs 43 and 45 of the antenna module 1. The fastening members 59 can be used for fastening a transmission element on the antenna 9.

By way of example, FIG. 3 shows a polymer fiber 63 for interconnecting the two transceivers 33. Each end 65 of the fiber 63 has a socket 67 adapted for receiving a transceiver 33. In a mated state, a transceiver 33 is received in the socket 67 such that the fiber 63 is in contact with or in close vicinity to the antenna 9. Thus, electromagnetic radiation from the antenna 9 can couple into the fiber 63 and electromagnetic radiation can couple from the fiber 63 into an antenna 9.

The sockets 67 have complementary fastening members 69 which include openings 71. The openings 71 are shaped complementary to the pin like fastening members 59 of the transceivers 33 such that the fastening members 59 can be received in the openings 71 to establish a positive fit between the transceivers 33 and the sockets 67.

Since the antenna module 1 has a circular polarizer 23, the communication system 55 has the advantage of a rotational freedom. In other words, the orientation of the antennas 9 with respect to a length direction 72 of the fiber 63 does not influence the quality of the transmission between the two transceivers 33. Both transceivers 33 could basically be rotated around the direction 72 without negatively influencing the transmission.

Alternatively to the complementary fastening members 69, the sockets 67 may also be connected to a transceiver 33 by other means or methods. For example, a socket 67 may be glued to a transceiver 33, in particular glued to the mounting structure 35.

Figure 4:
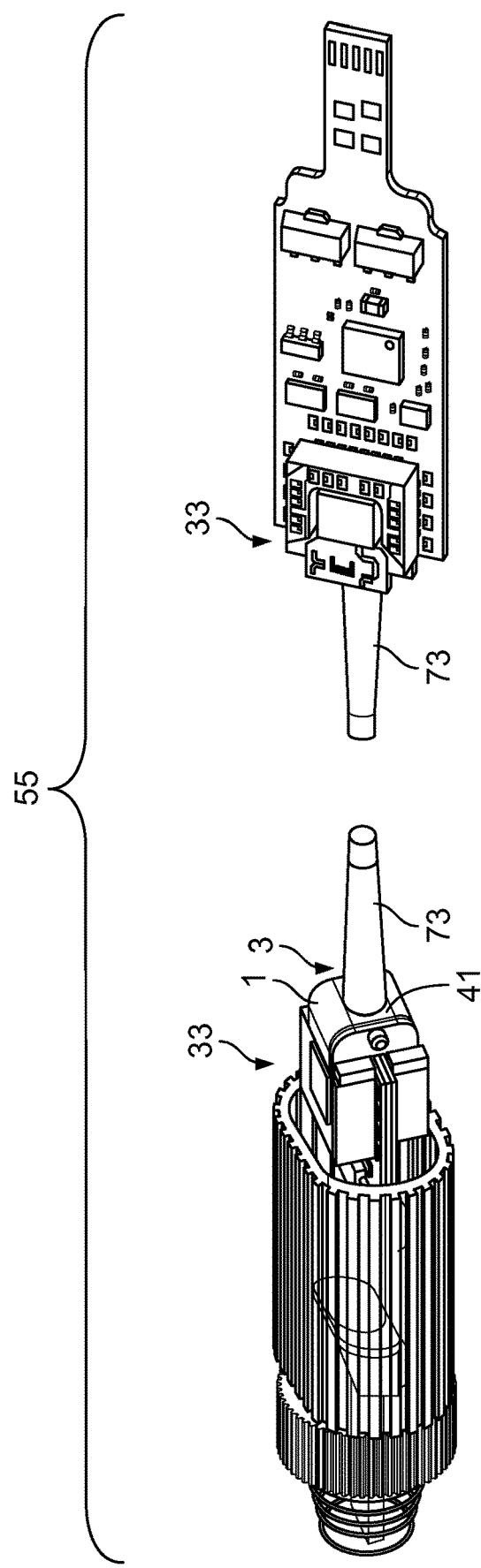
FIG. 4 is a perspective view of another exemplary application of two transceivers in a communication system according to the present invention.

Another application of the transceiver 33 and the antenna module 1 according to the present invention is shown in FIG. 4. For the sake of brevity, only the differences with the previously described embodiments are mentioned.

Instead of a connection using a fiber 63 as described with respect to FIG. 3, the communication system 55 as shown in FIG. 4 is capable of using wireless transmission.

Therefore, each transceiver 33 has an antenna 73. The antennas 73 are preferably made from dielectric material. The antennas 73 are arranged on the antenna section 3 of the antenna module 1 such that the antennas 73 basically extend perpendicular to the base 41 of the U-shape antenna module 1.

Figure 5:
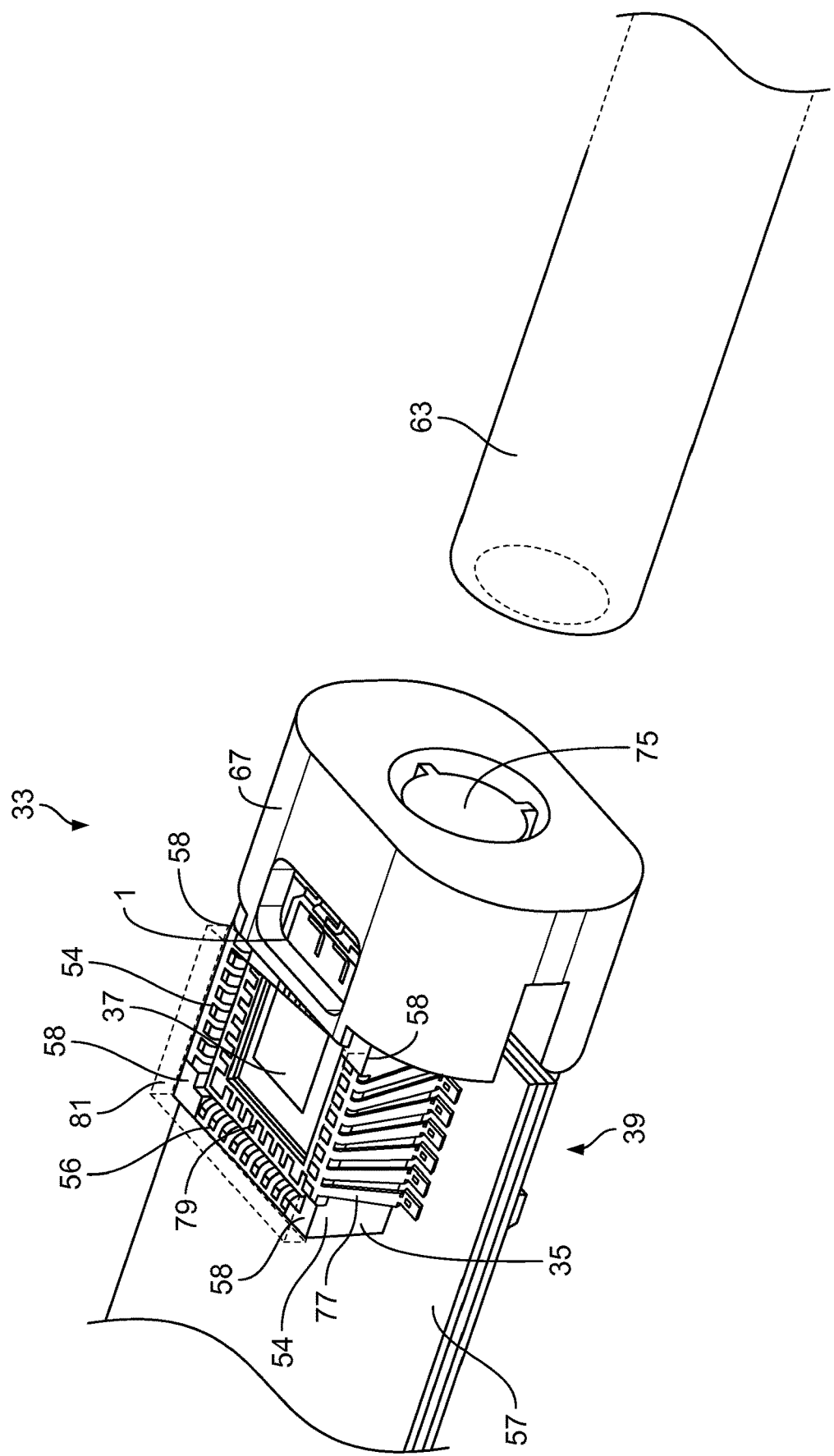
FIG. 5 is a perspective view of another exemplary embodiment of a transceiver constructed in accordance with the present invention.

FIG. 5 shows another exemplary embodiment of the transceiver 33 according to the present invention. The transceiver 33 is connected to a printed circuit board 57 and has a cap-like socket 67. The socket 67 may be mounted on the transceiver 33, (i.e., on the mounting structure 35) in a non-removable manner. In particular, the socket 67 may be affixed to the mounting structure 35 by gluing.

The socket 67 has an interface member 75 which can be in direct contact with the antenna 9 of the antenna module 1. The interface member 75 can be brought into contact with a fiber 63 to allow the transmission of electromagnetic radiation between the antenna 9 and the fiber 63. The fiber 63 may be mounted to the socket 67, in particular to the interface member 75, in a manner which provides a solid structure and low loss connection to the antenna 9.

Preferably, the fiber 63 is connected to the socket 67 in a way that allows a replacement of the fiber 63 without damaging the socket 67 and/or the transceiver 33. For example, the fiber 63 may be connected to the socket 67 by a heat shrink tube or by other appropriate means which allow a later replacement of the fiber 63.

Conductor traces 77 are arranged on the outer side 51 of the mounting structure 35 to electrically connect the receiver circuit 37 to the printed circuit board 57. It should be noted that the side of the transceiver 33, which has the transmitter circuit 39, is preferably connected in an equivalent manner.

The conductor traces 77 may be soldered to elements on the printed circuit board 57 and thereby connected to further traces or other conductors (not shown).

Ends 79 of the conductor traces 77, which are in the close vicinity of the receiver circuit 37, may be electrically connected to the receiver circuit 37 by bond wires (not shown). After connecting the circuit 37 to the conductor traces 77, at least the region of the ends 79 may have non-conductive resin in order to protect the contacts between the ends 79 and the bond wires. The resin may also be deposited at least partially on the receiver circuit 37 to protect the opposite ends of the bond wires. The side walls 54 and the rear wall 56 prevent resin from flowing off the mounting structure 35.

A heatsink structure 81 is indicated by the dashed line. The heatsink structure 81 can be arranged on and positioned by the support members 58.

As already mentioned, the opposite side of the transceiver 33, where the transmitter circuit 39 is located, can be arranged accordingly and preferably has similar features as described above.

What is claimed is:

1. An antenna module comprising:
a transmitter section;
at least one transmitter connection element in the transmitter section for connecting to a transmitter circuit;
a receiver section;
at least one receiver connection element in the receiver section for connecting to a receiver circuit;
at least one antenna section electrically connected between the at least one receiver section and the at least one transmitter section;
at least one antenna in the antenna section which receives electromagnetic radiation and transmits electromagnetic radiation; and
a carrier structure having an overall U-shape with the at least one antenna being located at a base of the U-shape.

2. An antenna module according to claim 1, wherein the carrier structure is in the form of a flexible printed circuit board substrate.

3. An antenna module according to claim 2, further including electrical components connected to the at least one antenna and to at least one of the transmitter connection element and the receiver connection element.

4. An antenna module according to claim 3, further including at least one polarizer circuit electrically connected to the at least one antenna.

5. An antenna module according to claim 4, wherein the at least one polarizer circuit provides circular polarized electromagnetic radiation.

6. An antenna module according to claim 5, further including at least one filter circuit electrically connected to the at least one transmitter connection element and to the at least one receiver connection element.

7. An antenna module according to claim 1, wherein the legs of the U-shape are parallel to and spaced apart from each other.

8. An antenna module according to claim 7, wherein the at least one receiver connection element is on one free end of a leg of the U-shape and the at least one transmitter connection element is on the free end of the other leg of the U-shape.

9. An antenna module according to claim 8, wherein at least one electrical component is located on a leg of the U-shape.

10. An antenna module according to claim 7:
(a) further including at least one filter circuit located on one of the legs of the U-shape, and
(b) wherein the at least one polarizer circuit is on the other leg of the U-shape.

11. A transceiver comprising:
at least one mounting structure;
a transmitter circuit;
a receiver circuit; and an antenna module bent around the at least one mounting structure, the antenna module comprising:

(a) a transmitter section, (b) at least one transmitter connection element in the transmitter section connected to the transmitter circuit;

(c) a receiver section, (d) at least one receiver connection element in the receiver section connected to the receiver circuit, (e) at least one antenna section electrically connected between the at least one receiver section and the at least one transmitter section, and (f) at least one antenna in the antenna section which receives electromagnetic radiation and transmits electromagnetic radiation.

12. A transceiver according to claim 11, wherein the antenna module at least partially envelops the at least one mounting structure.

13. A transceiver according to claim 11, wherein the at least one mounting structure comprises at least one fastening member for fastening the at least one transmitter connection element on the at least one antenna.

14. An antenna module according to claim 2, further including electrical components which are connected to the at least one antenna or to at least one of the transmitter connection element and the at least one receiver connection element.

15. An antenna module according to claim 2, further including at least one polarizer circuit electrically connected to the at least one antenna.

16. An antenna module according to claim 15, wherein the at least one polarizer circuit provides circular polarized electromagnetic radiation.

17. A transceiver comprising:
at least one mounting structure;
a transmitter circuit;
a receiver circuit; and
an antenna module at least partially enveloping the at least one mounting structure, the antenna module comprising:

(a) a transmitter section, (b) at least one transmitter connection element in the transmitter section connected to the transmitter circuit;

(c) a receiver section, (d) at least one receiver connection element in the receiver section connected to the receiver circuit, (e) at least one antenna section electrically connected between the at least one receiver section and the at least one transmitter section, and (f) at least one antenna in the antenna section which receives electromagnetic radiation and transmits electromagnetic radiation.

18. A transceiver comprising:
at least one mounting structure;
a transmitter circuit;
a receiver circuit; and
an antenna module comprising:

(a) a transmitter section, (b) at least one transmitter connection element in the transmitter section connected to the transmitter circuit;

(c) a receiver section, (d) at least one receiver connection element in the receiver section connected to the receiver circuit, (e) at least one antenna section electrically connected between the at least one receiver section and the at least one transmitter section, and (f) at least one antenna in the antenna section which receives electromagnetic radiation and transmits electromagnetic radiation, the at least one mounting structure has at least one fastening member for fastening the at least one transmitter connection element on the at least one antenna.

* * * * *